United States Patent
Grigore et al.

(10) Patent No.: US 12,318,938 B2
(45) Date of Patent: Jun. 3, 2025

(54) MULTI-TARGET LIBRARIES, PROJECTS, AND ACTIVITIES FOR ROBOTIC PROCESS AUTOMATION

(71) Applicant: UiPath, Inc., New York, NY (US)

(72) Inventors: Mircea Grigore, Bucharest (RO); Bogdan Toma, Bucharest (RO)

(73) Assignee: UiPath, Inc., New York, NY (US)

( * ) Notice: Subject to any disclaimer, the term of this patent is extended or adjusted under 35 U.S.C. 154(b) by 648 days.

(21) Appl. No.: 17/553,192

(22) Filed: Dec. 16, 2021

(65) Prior Publication Data

US 2023/0191601 A1   Jun. 22, 2023

(51) Int. Cl.
*B25J 9/16* (2006.01)
(52) U.S. Cl.
CPC ............ *B25J 9/1661* (2013.01); *B25J 9/1682* (2013.01); *G05B 2219/31342* (2013.01)
(58) Field of Classification Search
CPC .................. B24J 9/1661; B25J 9/1682; G05B 2219/31342
See application file for complete search history.

(56) References Cited

U.S. PATENT DOCUMENTS

| | | |
|---|---|---|
| 11,113,105 B1 | 9/2021 | Ahmed et al. |
| 2020/0004798 A1* | 1/2020 | Weinert, Jr. ........ G06F 16/9577 |
| 2020/0348964 A1 | 11/2020 | Anand et al. |
| 2020/0384644 A1 | 12/2020 | Chae |
| 2021/0117895 A1 | 4/2021 | Tondevold et al. |

OTHER PUBLICATIONS

ClointFusion Python-Based Automation (RPA) Platform Page available at https://www.joyk.com/dig/detail/1636530809543020 (Nov. 10, 2021).

* cited by examiner

*Primary Examiner* — Wissam Rashid
(74) *Attorney, Agent, or Firm* — LeonardPatel PC; Michael A. Leonard, II; Sheetal S. Patel

(57) ABSTRACT

Multi-target libraries, projects, and activities for robotic process automation (RPA) are disclosed. Some embodiments multiple target platforms can be handled in the same project. The target platform(s) can be specified at the automation and/or activity level in order to provide the supported functionality for each. This may also allow previously built automations to be applied to new target frameworks without starting from scratch.

26 Claims, 17 Drawing Sheets

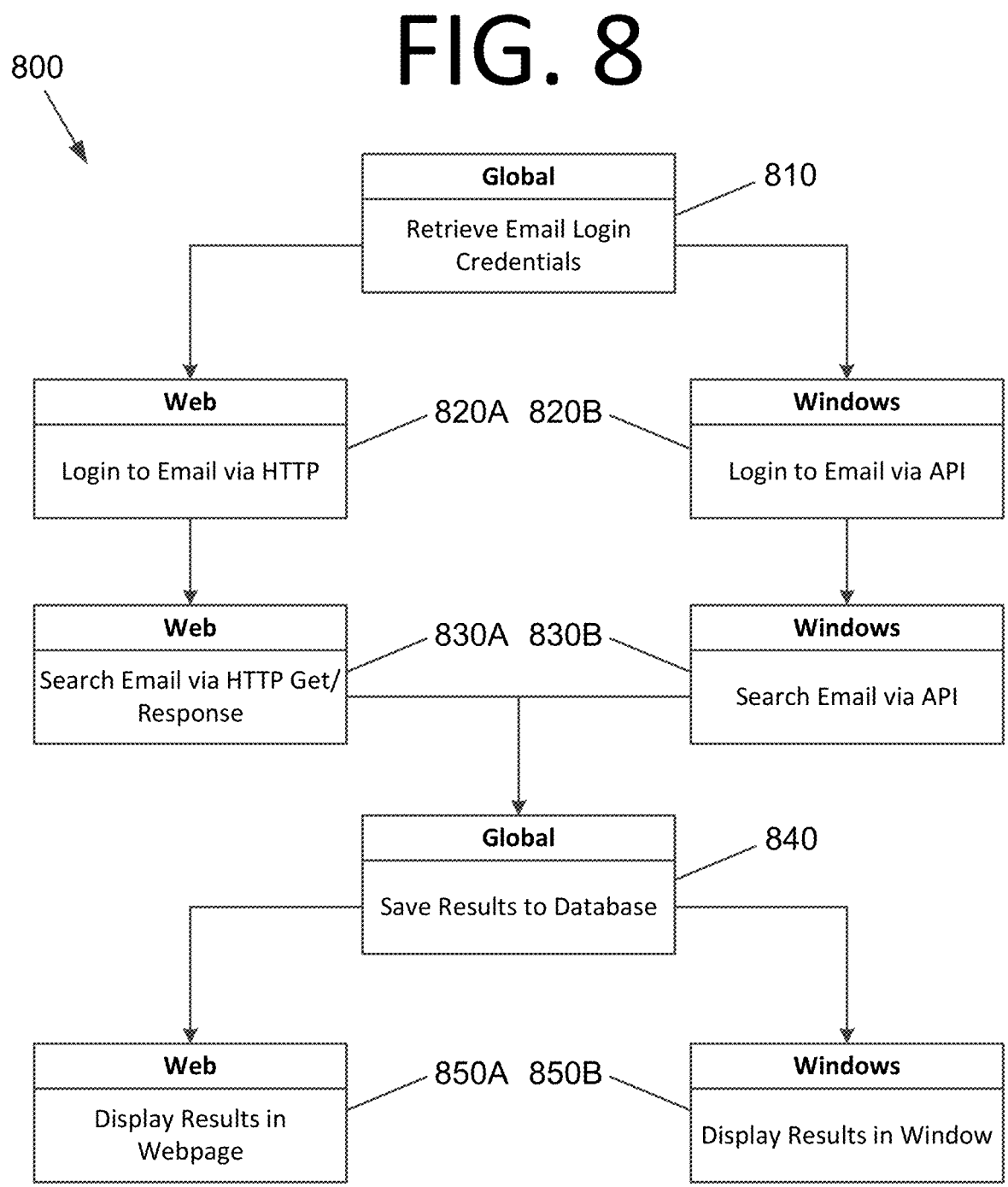

MULTI-TARGET LIBRARIES, PROJECTS, AND ACTIVITIES FOR ROBOTIC PROCESS AUTOMATION

FIELD

The present invention generally relates to robotic process automation (RPA), and more specifically, to multi-target libraries, projects, and activities for RPA.

BACKGROUND

Currently, different versions of RPA workflows are developed for different targets, such as Windows®, Mac®, Linux®, a mobile operating system (OS), etc. Thus, multiple versions are generated for the same automation. This is cumbersome and leads to project and library multiplicity, as well as more difficulty with version control, bug fixes, and updates. Furthermore, RPA activities do not currently have functionality to specify target platforms. Accordingly, an improved approach to managing RPA libraries and projects, as well as RPA activities themselves, may be beneficial.

SUMMARY

Certain embodiments of the present invention may provide solutions to the problems and needs in the art that have not yet been fully identified, appreciated, or solved by current RPA technologies. For example, some embodiments of the present invention pertain to multi-target libraries, projects, and activities for RPA.

In an embodiment, a computing system includes memory storing computer program instructions for a multi-target RPA designer application and at least one processor configured to execute the computer program instructions. The computer program instructions are configured to cause the at least one processor to receive a target platform configuration for an RPA project, receive multiple target platform versions of one or more activities of an RPA workflow, or both. The computer program instructions are also configured to cause the at least one processor to configure the RPA project in accordance with the target platform configuration, configure the multiple versions of the one or more activities for the respective target platform, or both. The RPA project accommodates multiple target platforms.

In another embodiment, a non-transitory computer-readable medium stores a computer program for a multi-target RPA designer application. The computer program is configured to cause at least one processor to receive a target platform configuration for an RPA project and configure the RPA project in accordance with the target platform configuration. The RPA project accommodates multiple target platforms.

In yet another embodiment, a computer-implemented method includes receiving multiple target platform versions of one or more activities of an RPA workflow, by a multi-target RPA designer application executing on a computing system. The computer-implemented method also includes configuring the multiple versions of the one or more activities for the respective target platform, by the multi-target RPA designer application. The RPA project accommodates multiple target platforms.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 8 illustrates a multi-target RPA workflow 800, according to an embodiment of the present invention.

Unless otherwise indicated, similar reference characters denote corresponding features consistently throughout the attached drawings.

DETAILED DESCRIPTION OF THE EMBODIMENTS

Figure 1:
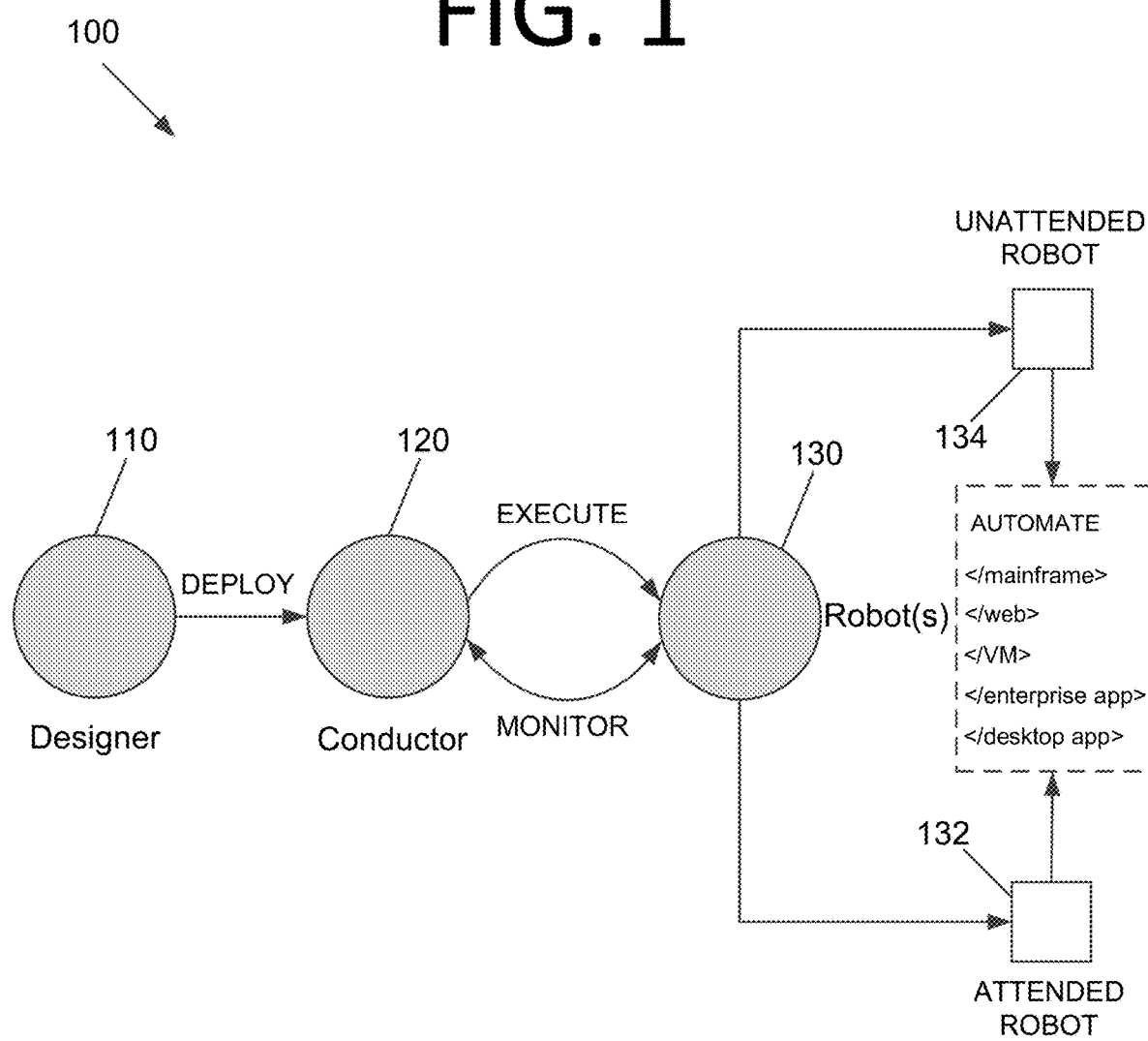
FIG. 1 is an architectural diagram illustrating an RPA system, according to an embodiment of the present invention.

Some embodiments pertain to multi-target libraries, projects, and activities for RPA. Conventionally in RPA, multiple different libraries and projects with their own activities are generated for each target platform. For instance, separate projects and libraries may be developed for legacy targets, .NET Core, cross-platform (e.g., able to run on both Windows® and Linux®), Apple® OS X, native mobile, and the like. In other words, multiple versions of the same automation are created for each platform. This requires additional developer resources and can lead to version control, maintenance, and/or deployment issues.

Some embodiments allow multiple target platforms to be handled in the same project. The target platform(s) can be specified at the automation and/or activity level in order to provide the supported functionality for each. This may also allow previously built automations to be applied to new target frameworks without starting from scratch.

In some embodiments, each activity may have a tag, a variable, an array, or some other descriptor or data structure that specifies the target platform(s) for a given activity. This allows for the development of all activities for all intended target platforms in the same workflow, where the RPA robot only executes activities that are tagged for the current target platform at runtime. For instance, a single project may be published that includes activities for Linux®, OS X, Windows®, native mobile, and for all four, but when executing the automation on Windows, only the activities for "Windows" or "All" as the target are executed.

In some embodiments, long-running workflows may be used where different computing systems involved in the long-running workflow have different target platforms. Long-running workflows for RPA in some embodiments are master projects that support service orchestration, human intervention, and long-running transactions in attended or unattended environments. Human intervention comes into play when certain processes require human inputs to handle exceptions, approvals, or validation before proceeding to the next step in the activity. In this situation, the process execution is suspended, freeing up the RPA robot(s) until the human task completes.

A long-running workflow may support workflow fragmentation via persistence activities and may be combined with invoke process and non-user interaction activities, orchestrating human tasks with RPA robot tasks. The long-running workflow may run in a session to facilitate speedy execution. In some embodiments, long-running workflows may orchestrate background processes that may contain activities performing Application Programming Interface (API) calls and running in the long-running workflow session. These activities may be invoked by an invoke process activity in some embodiments. A process with user interaction activities that runs in a user session may be called by starting a job from a conductor activity (conductor described in more detail later herein). The user may interact through tasks that require forms to be completed in the conductor in some embodiments. Activities may be included that cause the RPA robot to wait for a form task to be completed and then resume the long-running workflow.

For some multi-target embodiments, long-running workflows can be designed such that parts of the overall (master) process collectively performed by a combination of platforms/devices are executed on native mobile, Mac® OS X, Windows®, etc. Furthermore, in some embodiments, a user's part of the overall process may be executed on whatever supported device and platform that the user is logged into. For example, a part of the long-running workflow may be an attended piece that, with multi-target support, can be executed regardless of whether the user logs into a Mac® OS or Windows®. This is not currently possible for RPA systems. Thus, a user is able to run his or her portion of the automation regardless of the supported platform that he or she is using.

For attended automation in some embodiments, a user may be prompted with forms, callouts, etc. However, this functionality is typically operating system (OS)-dependent. While such a notification could be provided via a web browser as a broader or even universal solution, this may not be desirable for some implementations. Accordingly, in some embodiments, an automation may be built once and then multi-target functionality may ensure that such forms and callouts are provided in the target platform.

Native functionality may be used for the given target. This native functionality may be used to provide OS-dependent functionality, including full desktop interaction between the user and the automation, for example. A full-blown native application may be provided that makes calls to the OS in order to fulfill the design of the automation and the user's expectations. The automation can thus monitor user actions and continue execution based on current context of the user. Context may include, but is not limited to, desktop resources, location, availability of applications, user OS-specific actions, etc.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
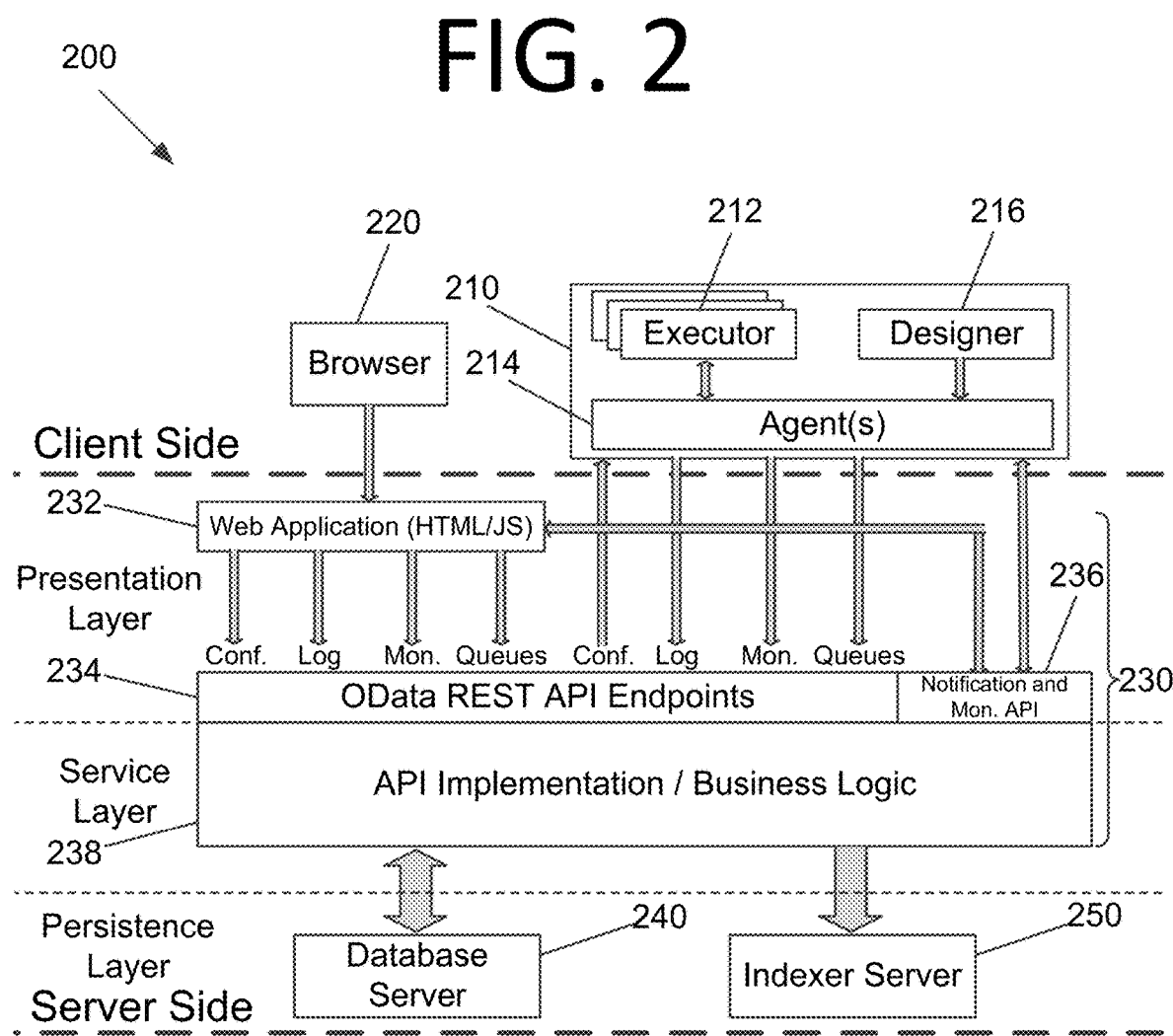
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
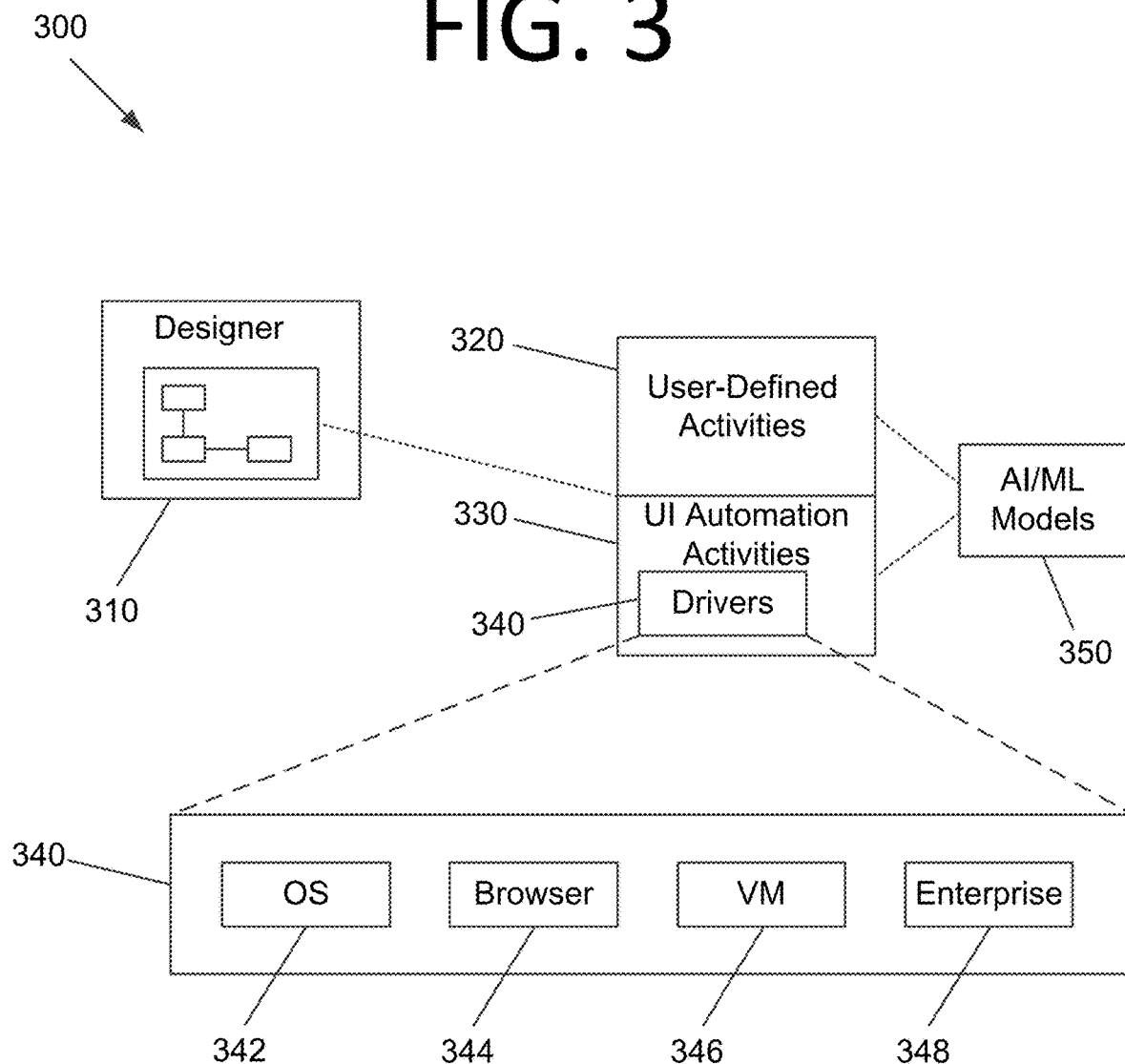
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, drivers 340, and AI/ML models 350, according to an embodiment of the present invention. Per the above, a developer uses designer 310 to develop workflows that are executed by robots. Workflows may include user-defined activities 320 and user interface (UI) automation activities 330. User-defined activities 320 and/or UI automation activities 330 may call one or more AI/ML models 350 in some embodiments, which may be located locally to the computing system on which the robot is operating and/or remotely thereto. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 and/or AI/ML models 350 that allow the robot to interact with the desired software. For instance, drivers 340 may include OS drivers 342, browser drivers 344, VM drivers 346, enterprise application drivers 348, etc. One or more of AI/ML models 350 may be used by UI automation activities 330 in order to determine perform interactions with the computing system. In some embodiments, AI/ML models 350 may augment drivers 340 or replace them completely. Indeed, in certain embodiments, drivers 340 are not included.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
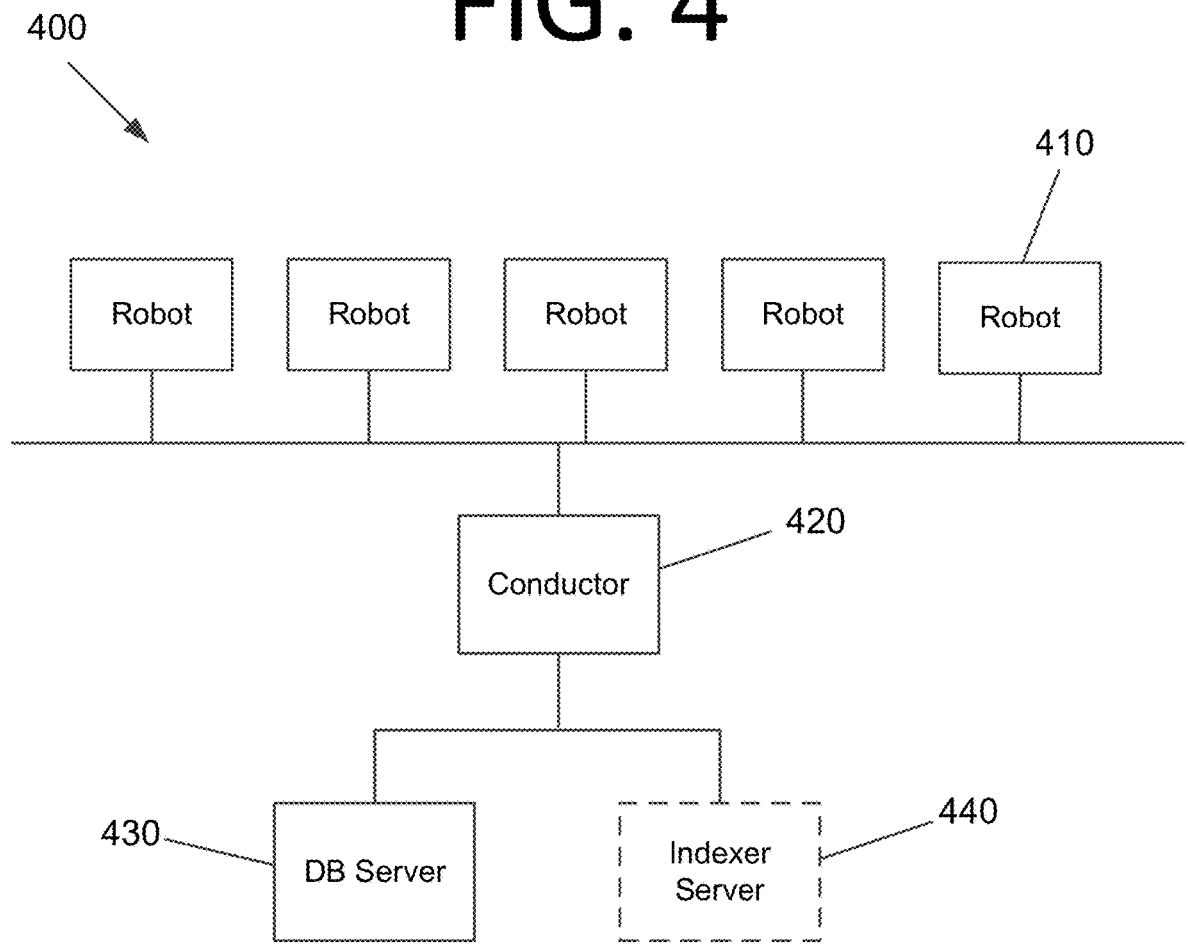
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
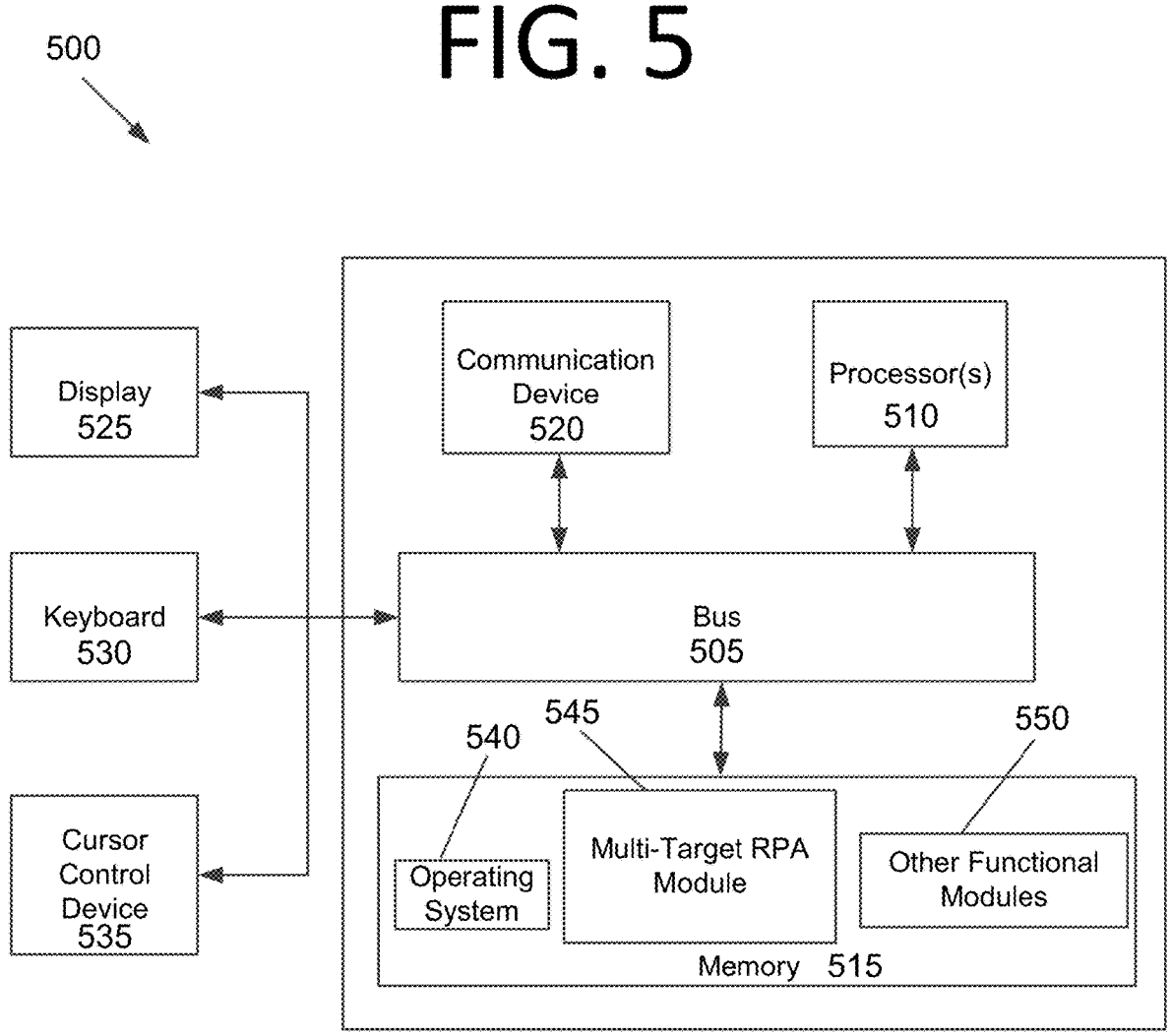
FIG. 5 is an architectural diagram illustrating a computing system configured to implement all or part of a multi-target RPA designer system, according to an embodiment of the present invention.

FIG. 5 is an architectural diagram illustrating a computing system 500 configured to implement all or part of a multi-target RPA system, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a multi-target RPA module 545 that is configured to perform all or part of the processes described herein or derivatives thereof. For instance, multi-target RPA module 545 may facilitate development of multi-target workflows and automations at design time or may implement a multi-target RPA automation at runtime. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
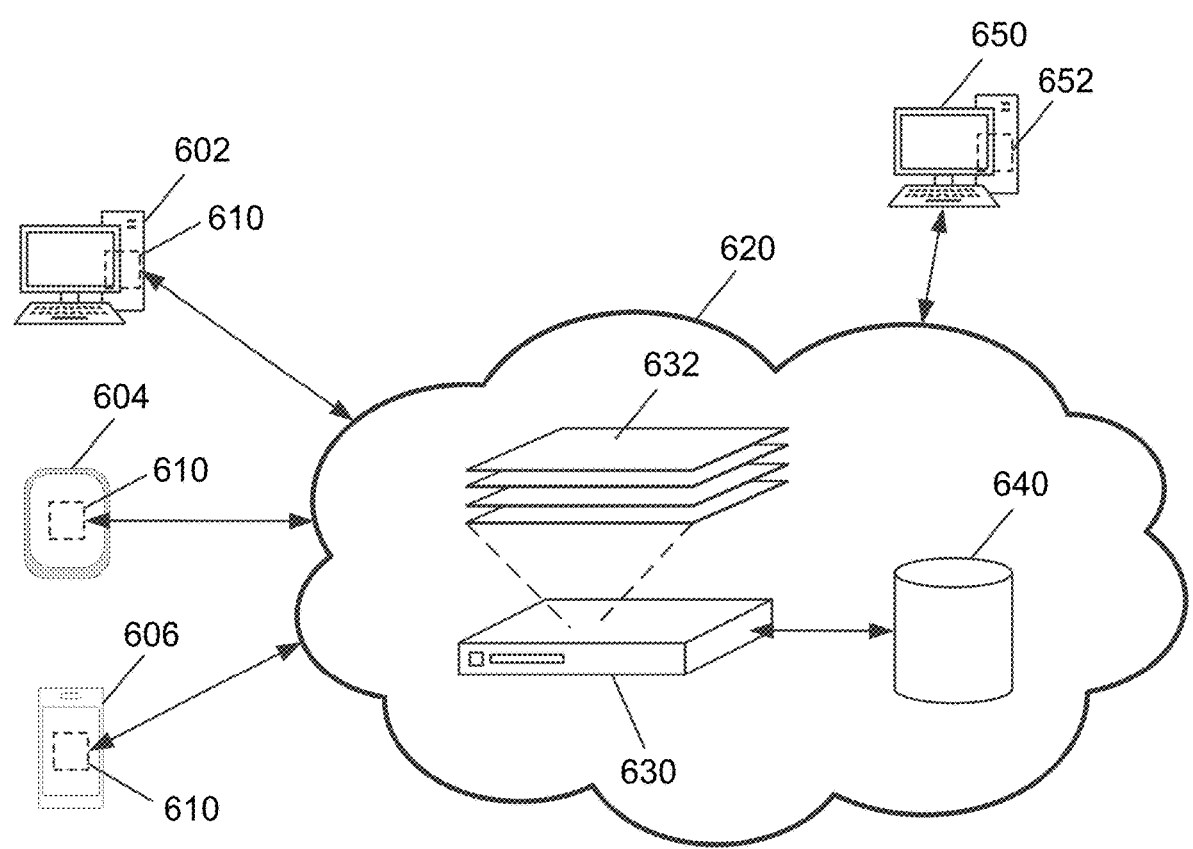
FIG. 6 is an architectural diagram illustrating a system configured to implement multi-target RPA functionality, according to an embodiment of the present invention.

FIG. 6 is architectural diagram illustrating a system 600 configured to provide multi-target RPA functionality, according to an embodiment of the present invention. System 600 includes user computing systems, such as desktop computer 602, tablet 604, and smart phone 606. However, any desired computing system may be used without deviating from the scope of invention including, but not limited to, smart watches, laptop computers, Internet-of-Things (IoT) devices, vehicle computing systems, etc.

Each computing system 602, 604, 606 has an RPA robot 610 installed thereon. RPA robot 610 may perform automations (e.g., via XAML scripts) locally, such as performing mouse clicks, entering text into text fields, providing screenshots, providing information appearing in text fields or other components of the web page, interacting with applications and other processes running via the operating system, etc. These automations may be multi-target automations, and RPA robot 610 may execute the portions of the automation that pertain to the target platform of the computing system.

RPA robots 610 and computing systems 602, 604, 606 communicate via a network 620 (e.g., a local area network (LAN), a mobile communications network, a satellite communications network, the Internet, any combination thereof, etc.) with a server 630. Server 630 may reside in a cloud architecture in some embodiments. Server 630 provides automations 632 that RPA robots 610 can access and execute. Server 630 stores data for automations 632 in a database 640 in some embodiments.

Automations 632 may be designed by an RPA developer using a multi-platform RPA designer application 652 running on computing system 650. The RPA developer can create or select projects, create or modify RPA workflows, add/modify/remove RPA workflow activities, etc. The RPA developer can also specify target platforms at the automation and/or activity level. For example, consider the case that the RPA developer wishes to develop an automation that accesses a user's Outlook email and searches for all emails including the text "invoice" in the subject, the body, or the name of an attached file that were received within the past week. The workflow may have some common elements for each platform, such as retrieving the username and password. However, while the credentials are the same, the mechanism for logging in differs between the desktop version of Outlook and the web version. For the desktop version, the activity logic may log in via an Outlook API. However, for the web version, the activity communicates remotely and submits the credentials via HTTP. Also, while the search queries are different, the place that those search queries are submitted to differs. Once the results are received, they may then be processed using the same activity logic.

Figure 7A:
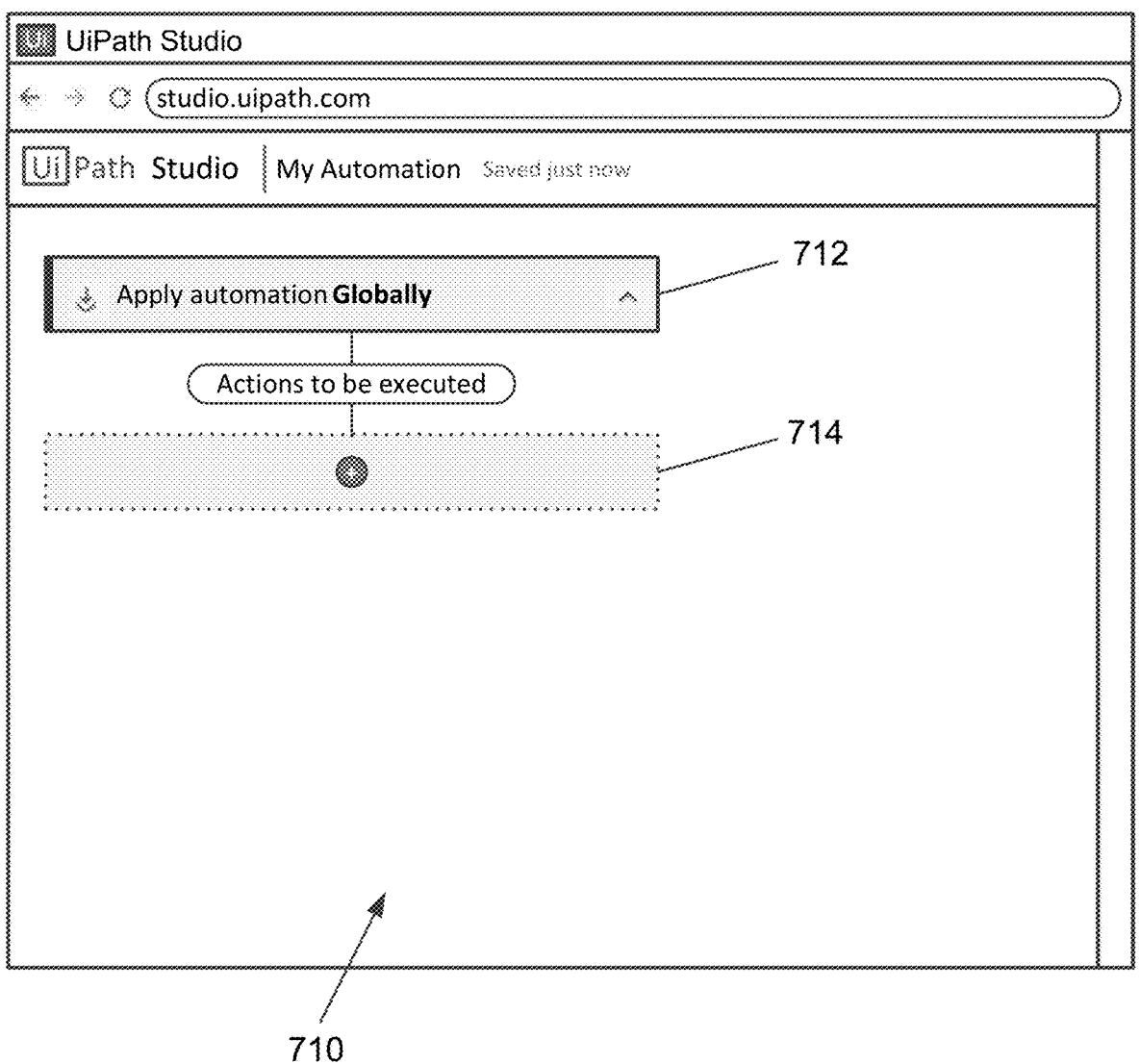
FIG. 7A illustrates a multi-target RPA development application, according to an embodiment of the present invention.
Figure 7B:
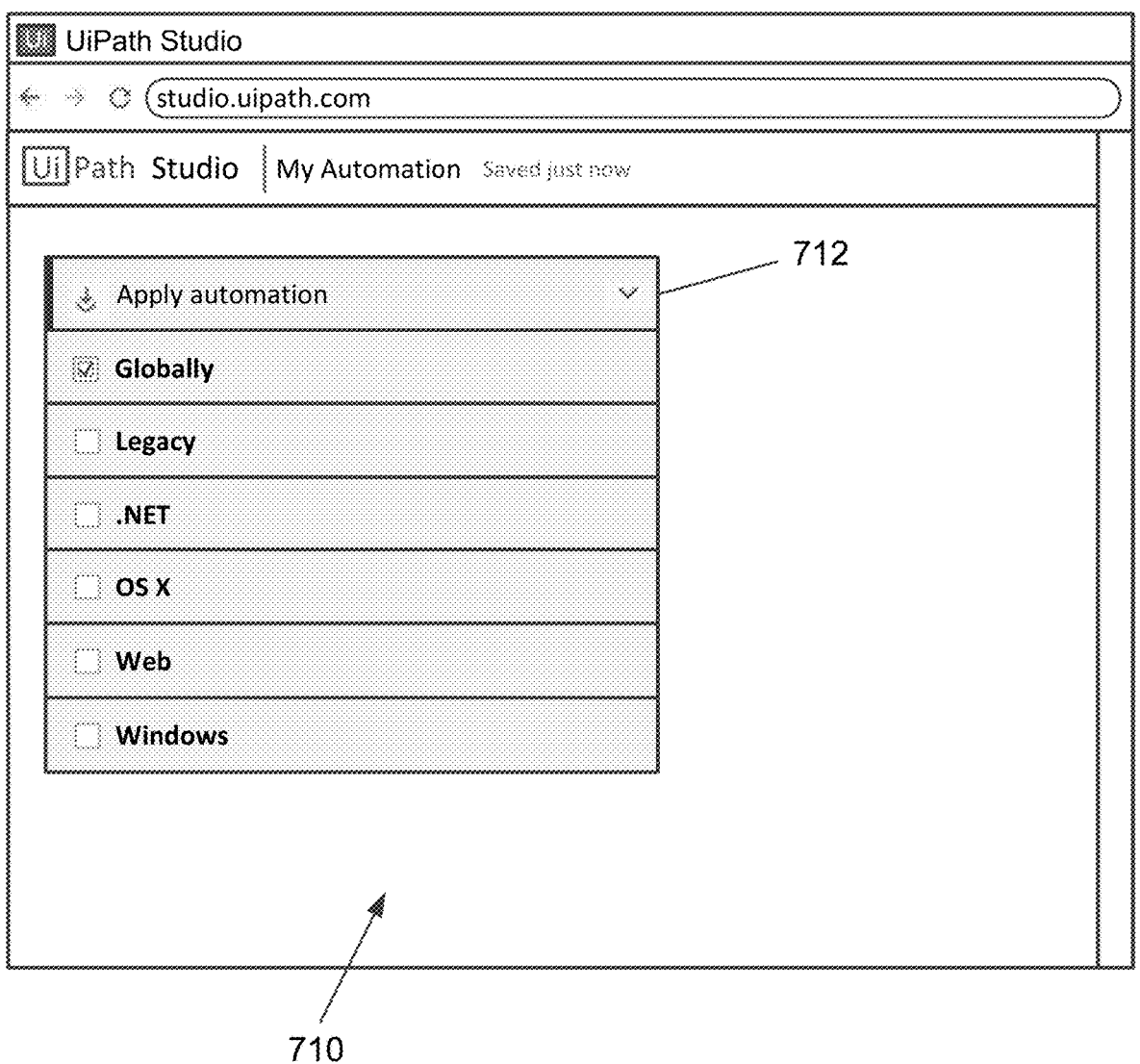
FIG. 7B illustrates a project-level target designation menu for the multi-target RPA development application, according to an embodiment of the present invention.

FIG. 7A is a screenshot illustrating a multi-target RPA designer application 700, according to an embodiment of the present invention. However, it should be noted that while a web RPA designer application is shown, a desktop version with similar functionality may also be used without deviating from the scope of the invention. Multi-target RPA designer application 700 includes a canvas 710 where automations can be designed. A project target platform designation option 712 allows the RPA designer to designate the target platform(s) that the automation will be applied to. In this example, the user has selected "Globally," indicating that the automation will apply to all supported target platforms. However, the RPA developer may also choose to have the automation apply to a single target or multiple targets by selecting the desired platforms. See FIG. 7B.

Global activities may allow the developer to make the automation application-agnostic and/or platform-agnostic. For a send email activity, for example, the developer may not want to have to create multiple versions of the activity for different applications. Connection information, a list of running processes in the operating system, user login credentials for the application (e.g., as done in step 810 of FIG. 8), or any other suitable source may be used to determine the right platform and application without deviating from the scope of the invention.

Figure 7C:
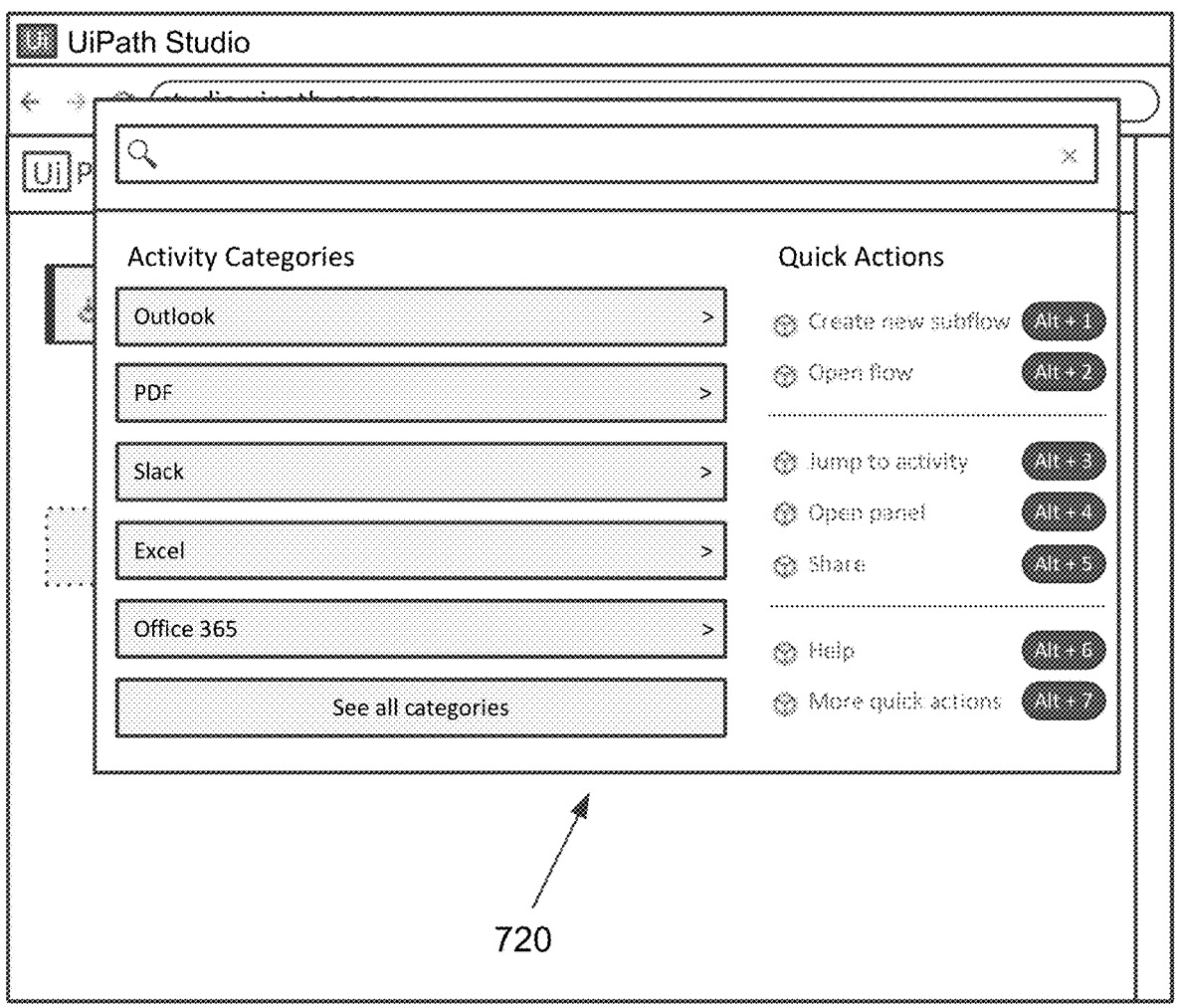
FIG. 7C illustrates the multi-target RPA development application with an activity categories and quick actions window, according to an embodiment of the present invention.
Figure 7D:
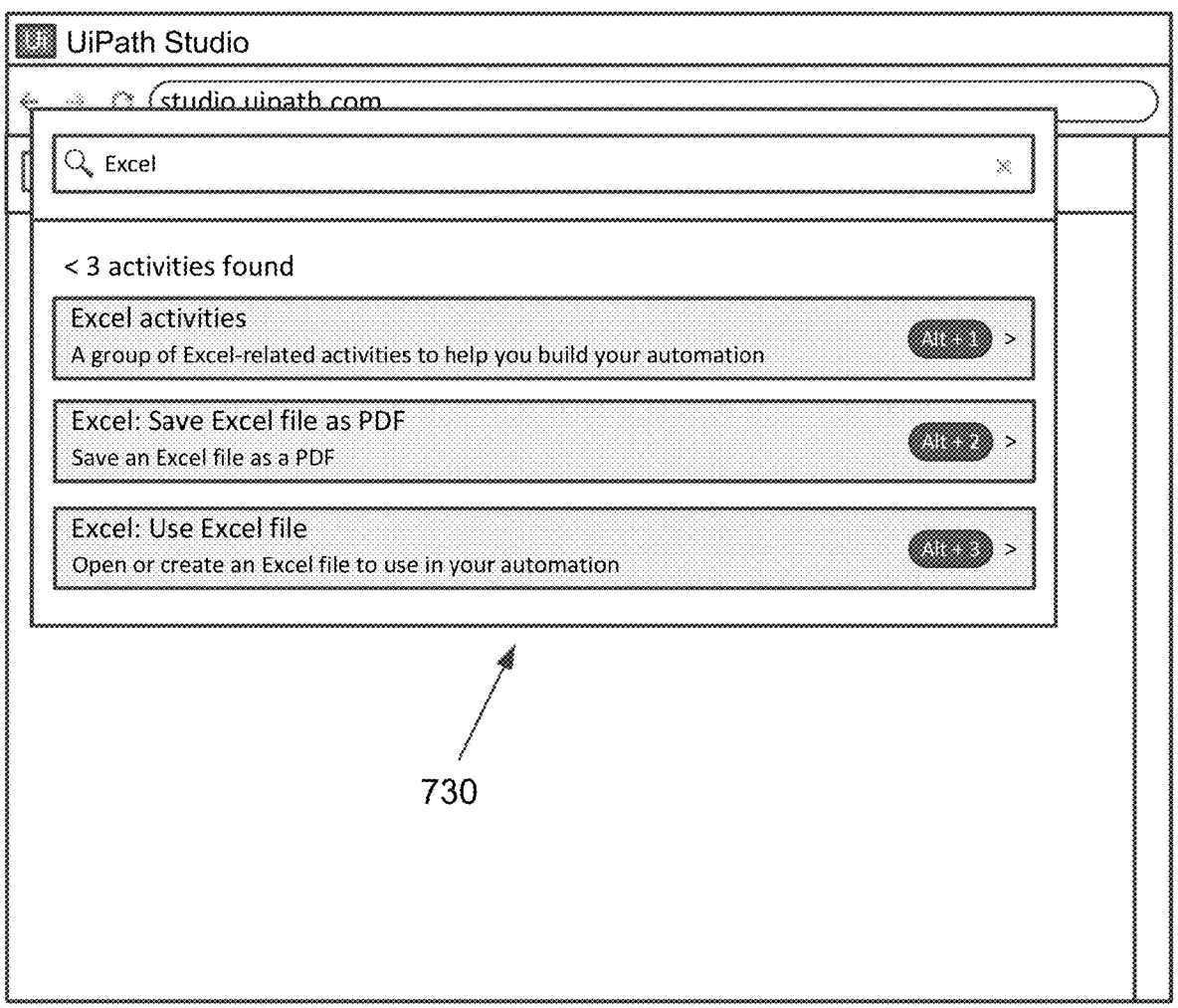
FIG. 7D illustrates the multi-target RPA development application with an Excel® activities window, according to an embodiment of the present invention.
Figure 7E:
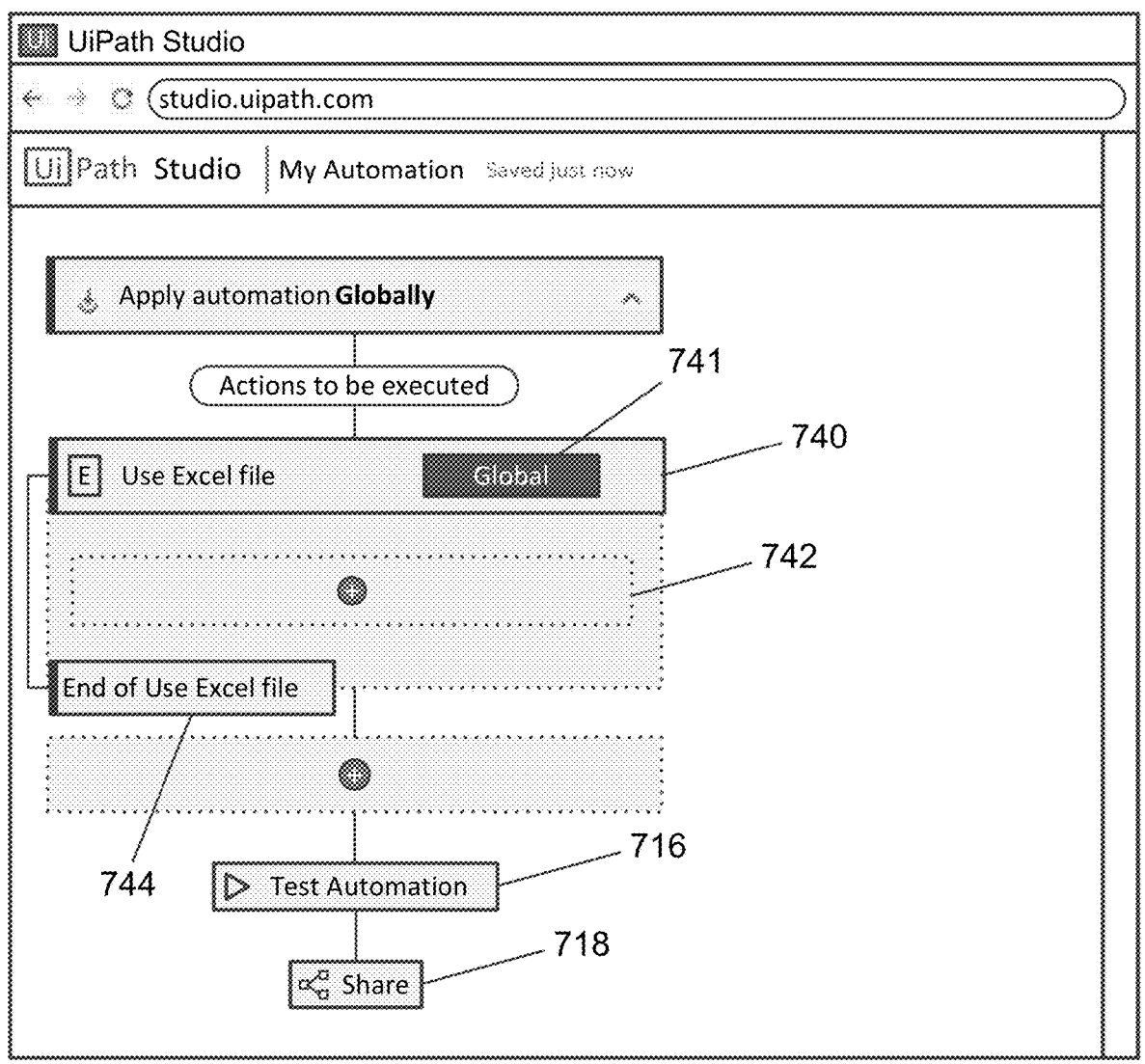
FIG. 7E illustrates the multi-target RPA development application with an unconfigured use Excel® file activity, according to an embodiment of the present invention.

Activities can be added by the user by clicking empty activity 714. When the user clicks empty activity 714, an activity categories and quick actions window 720 appears. See FIG. 7C. The user can search for or choose from the listed categories. For instance, if the user clicks Excel®, an Excel® activities Window 730 appears with options for Excel® activities. See FIG. 7D.

If the user chooses to use an Excel® file, a use Excel® file activity 740 is created that can be configured by the RPA developer. In this embodiment, activities default to "Global" in scope. However, the RPA developer may modify the target platforms for the activity by clicking button 741, which may bring up a similar selection interface to that shown in FIG. 7B. Nested activities can be provided within activity 740 via option 742, if appropriate. This may bring up the same or a similar window to window 720 of FIG. 7C. Label 744 indicates the end of activity 740. An option 716 to run a test automation and an option 718 to share the automation project also appear. This may allow the user to validate workflows as they are created, as well as share their work with others.

Figure 7F:
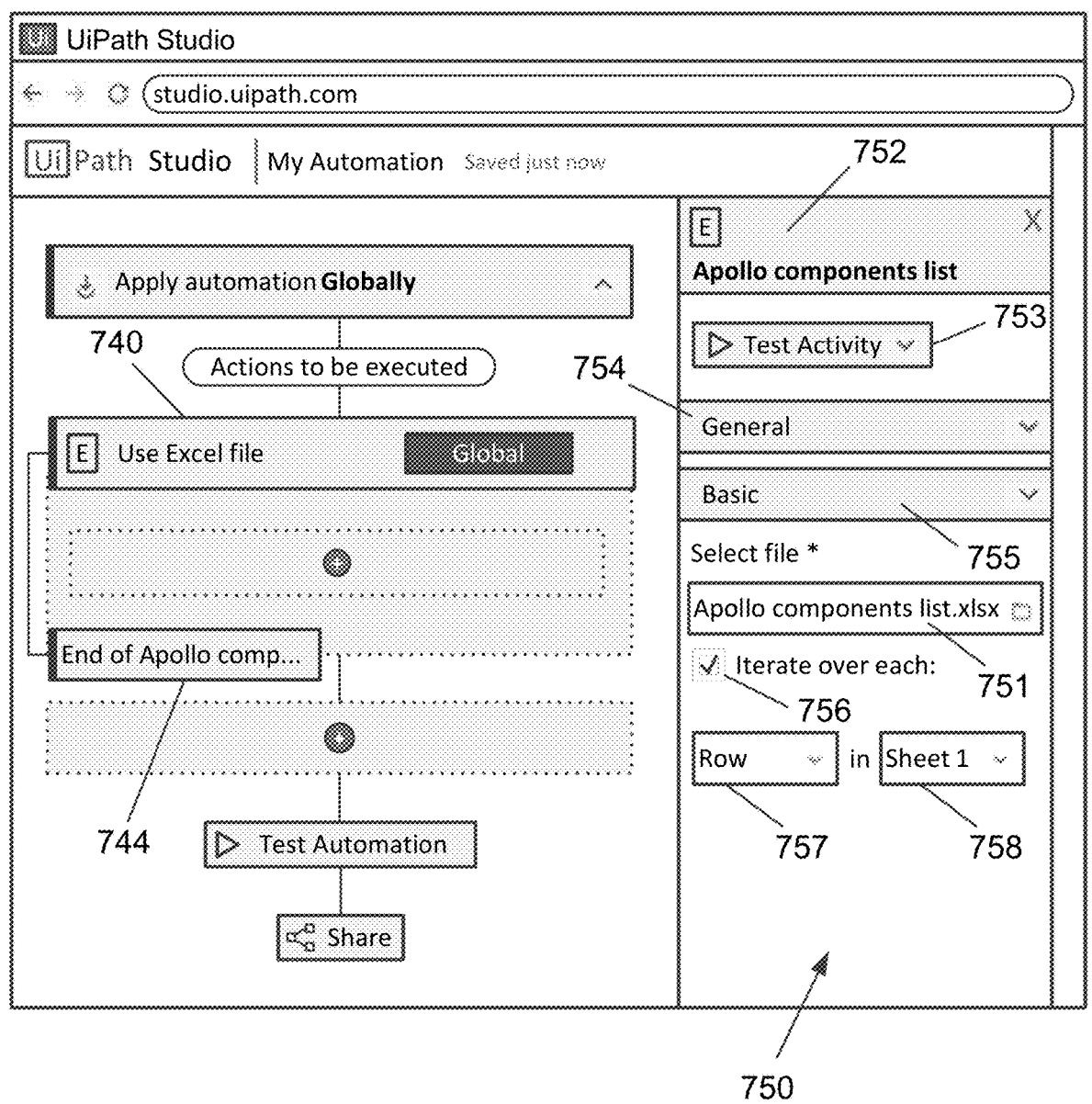
FIG. 7F illustrates the multi-target RPA development application after the use Excel® file activity has been configured, according to an embodiment of the present invention.

When the RPA developer configures an activity, various activity-specific options appear. For instance, if the user clicks activity 740, options appear on the right side in an options pane 750. See FIG. 7F. In this case, the user selects the Excel® file "Apollo components list.xlsx" from file selection menu 751. The file name appears in file name listing 752. The user can test the configuration of the activity using test activity menu 753, as well as configure general options 754 and basic options 755, which are groupings of properties specific to a given activity. More specific options can also be configured. For instance, the user can choose iterate over each checkbox 756, which allows the user to select the element in the spreadsheet that the activity will iterate over. Here, the user has selected "Row" with option 757 and "Sheet 1" of the spreadsheet with option 758. In some embodiments, the target platform(s) for the activity may be specified in options pane 750 in addition to or in lieu of via button 741.

It should be noted that FIGS. 7A-F are provided by way of example only, and that various other activities and conditions may be configured without deviating from the scope of the invention. For instance, the RPA developer may choose to perform different actions on the Excel® file if different conditions exist (for instance, sending an email regarding a deadline for a component has passed if it has passed versus sending an email with a new finalized component and writing to a cell that updates a status in Excel® if the component is not past due, sending emails and/or messages in other non-email applications, etc. Automations may be designed using RPA designer application 700 of some embodiments that can interact with a webpage, obtain information from the webpage, and perform desired RPA robot actions on the server side that may include interaction with the user's webpage, interacting with other RPA robots on the server side or locally on user computing systems, retrieving information from a database, interacting with local applications or other processes, or any other RPA process(es) without deviating from the scope of the invention.

FIG. 8 illustrates a multi-target RPA workflow 800, according to an embodiment of the present invention. In this embodiment, some activities of RPA workflow 800 are global for both the web and Windows, and other RPA activities are platform-specific. Using the general email example from earlier, when executing the automation, the RPA robot retrieves email login credentials for a user from a database via global activity 810. However, the mechanism for logging in and searching the email differs between the web and Windows. The RPA robot logs into the user's email using HTTP via web activity 820A and via an API using Windows activity 820B. The RPA robot only executes activities that are pertinent to the platform on which the RPA robot is operating. For example, to search for emails including the term "invoice" that have been received in the past week, the RPA robot uses an HTTP get/response for web activity 830A and another API (or potentially multiple APIs) for Windows activity 830B. Results of the search are then stored in a database via global activity 840. Since the display mechanism for the web and Windows also differs, the RPA robot displays the results in a webpage via web activity 850A and in a window via Windows activity 850B.

Figure 9:
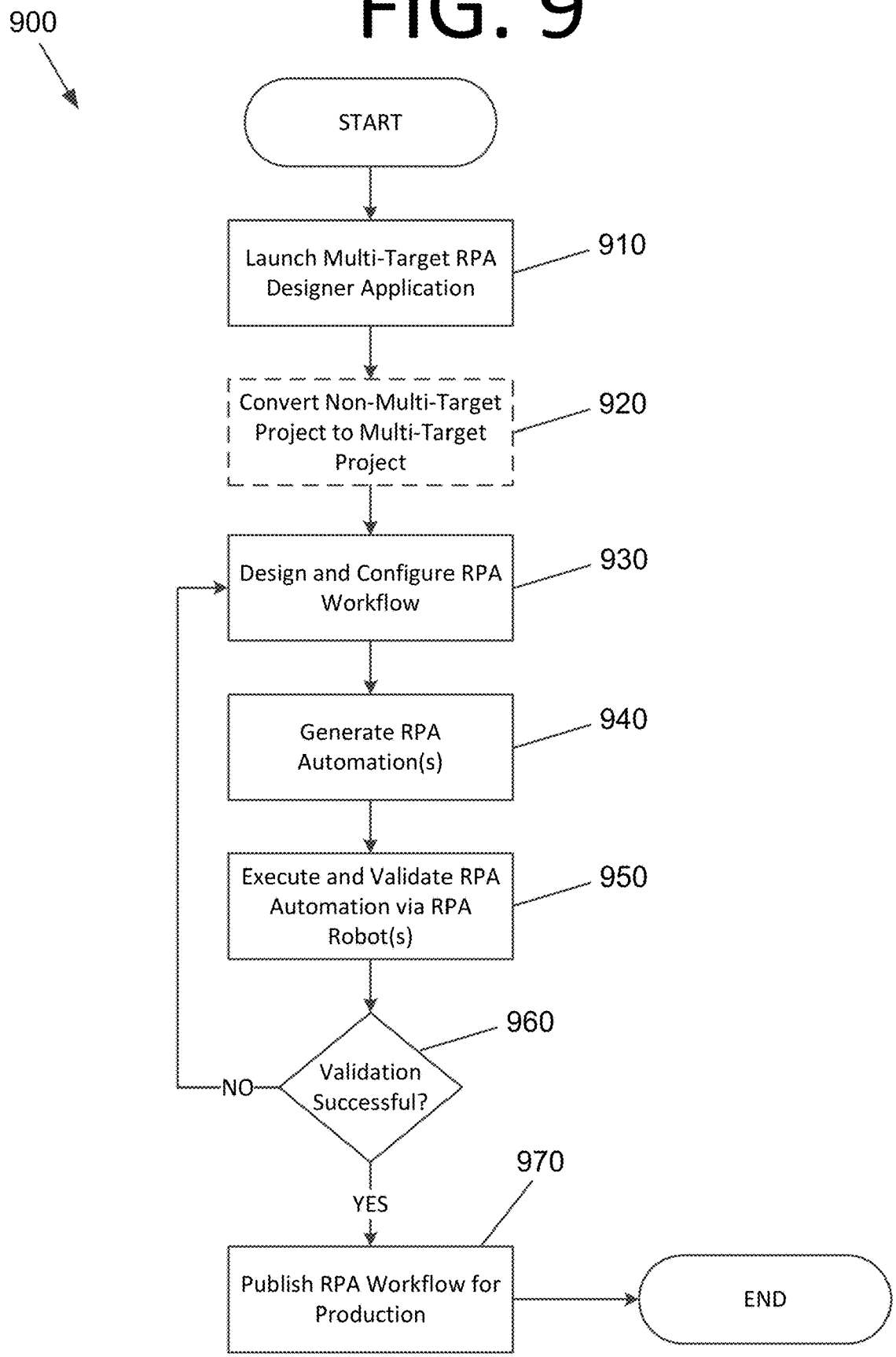
FIG. 9 is a flowchart illustrating a process for performing multi-target RPA development at design time, according to an embodiment of the present invention.

FIG. 9 is a flowchart illustrating a process 900 for performing multi-target RPA development at design time, according to an embodiment of the present invention. The process begins with launching a multi-target RPA designer application at 910. If the developer loads an existing non-multi-platform RPA project, the multi-target RPA developer application converts the non-multi-platform RPA project into a multi-target RPA project at 920. This may be done at the instruction of the RPA developer or automatically. The conversion may include adding global activities and/or corresponding activities for each target platform, for instance. The RPA designer application may be able to locate this information based on the operating system(s), versions stored in a UI object repository, etc.

RPA workflow configurations are then received for the project and/or individual activities at 930, unless the developer is only converting a non-multi-target RPA project into a multi-target RPA project. These configurations may include target platform selections and/or individual activity target platform version configurations in some embodiments. In certain embodiments, versions of the RPA workflow for multiple or all target platforms may be created automatically without the developer needing to select this option manually. If mouse click activities, selectors and/or other UI descriptors, etc. already exist for a given target platform, these may be identified and used for corresponding activities of the RPA workflow. For instance, if an activity pertains to clicking a certain button on a screen of an application, the system may search for the corresponding UI descriptor for each supported target platform that the application runs on. This could be considered an "automatic global" configuration. In other words, the automation itself may determine the target platform that it is running on and then use the appropriate UI descriptor for that target platform.

In some embodiments, activities that have not received a target platform designation may default to one or more platforms, to a global scope, etc. Each activity may have a tag, a variable, an array, or some other descriptor or data structure that specifies the target platform(s) for a given activity. This enables an RPA robot executing an automation generated from the RPA project to determine the appropriate step(s) to execute.

Once the RPA workflow has been created, the multi-target RPA designer application generates an automation implementing the workflow on the target platform(s) at 940. The RPA designer application then executes and validates the RPA automation on the target platform(s) via RPA robot(s) at 950. This may include running the automation via an RPA robot on each target platform and validating that the automation functions as intended on each platform. If the validation is successful at 960, the RPA workflow may be published for production (i.e., runtime use) at 970. This may include publishing the multi-target RPA workflow and its respective activities, as well as the automations, in a library of a UI object repository. See, for example, U.S. Nonprovisional patent application Ser. No. 16/922,289. If not successful, the process may return to step 930, and the RPA developer may modify the workflow in an attempt to remedy the errors.

A UI object repository (e.g., the UiPath Object Repository™) is a collection of UI object libraries, which are themselves collections of UI descriptors (e.g., for a certain version of an application and one or more screens thereof). The UI object libraries may be stored in a UI object repository in some embodiments. In some embodiments, the UI object repository may be a NuGet™ feed, a web service, etc. UI elements on the screen (e.g., text fields, buttons, labels, menus, checkboxes, etc.) can be grouped by applications, application versions, application screens, and collections of UI elements, and each screen has multiple UI elements. As used herein, a "screen" is an image of an application UI or a portion of the application UI at a certain point in time. An "application" or a version of a given application may be a union of screens in this context. Each UI element may be described by one or more UI descriptors in some embodiments. The UI elements, UI descriptors, applications, and application screens are UI objects. In some embodiments, UI elements and screens may be further differentiated into specific types of UI elements (e.g., buttons, checkboxes, text fields, etc.) and screens (e.g., top windows, modal windows, popup windows, etc.).

An example of an object library structure is provided below.
SAP
  version 1
    screen 1
      object 1
      object 2
      . . .
    screen 2 . . .
    . . .
  version 2 . . .
  . . .
Salesforce . . .
. . .

It should be noted that the hierarchy above is provided by way of example only. Any desired number of levels in the hierarchy and elements associated with each level may be used without deviating from the scope of the invention. In certain embodiments, the developer can define the application map as he or she desires. Moreover, some nodes in the tree may only serve a management role and not a functional one in some embodiments. For instance, UI elements may be grouped together into a container that does not have UI descriptors. The container may exist for the purpose of grouping only in some embodiments.

To make UI objects reusable, they may be extracted into UI object libraries that can be referenced by RPA processes. When selectors or other UI descriptors are modified due to a new version of an application, for example, the library may be recreated (or republished) to include the modified UI descriptors. RPA processes using the UI object library may then call the modified UI descriptor versions. References to the new application programming interface (API) associated with the new library may be modified for an RPA process manually by a developer, modified via a software tool (e.g., a tool that goes through an RPA process and updates UI descriptor references when selectors or other components thereof change), or automatically in some embodiments.

In some embodiments, packages of UI objects may be attached as a dependency (e.g., NuGet™ packages). However, in certain embodiments, the UI objects may be obtained via one or more API calls to a web service. This enables the UI objects to be stored remotely and retrieved and used during the automation.

Selectors are a type to UI descriptor that may be used to detect UI elements in some embodiments. A selector has the following structure in some embodiments:
  <node_1/><node_2/> . . . <node_N/>

The last node represents the GUI element of interest, and all previous nodes represent the parents of that element. <node_1> is usually referred to as a root node, and represents the top window of the application.

Each node may have one or more attributes that assist with correct identification of a specific level of the selected application. Each node has the following format in some embodiments:
  <ui_system    attr_name_1='attr_value_1' . . . attr_name_N='attr_value_1N'/>

Every attribute may have an assigned value, and attributes with constant values may be selected. This is because changes to the value of an attribute each time the application is started may lead to the selector not being able to correctly identify the associated element.

UI object library descriptors may be added directly to an RPA workflow activity, saving developer time that may otherwise be required to create a custom selector for the activity. An object library is defined herein as a collection of UI descriptors corresponding to one or more screens from a certain version of an application. A UI descriptor is a set of instructions for finding a UI element. UI descriptors in some embodiments are an encapsulated data/struct format that includes UI element selector(s), anchor selector(s), computer vision (CV) descriptor(s), unified target descriptor(s), a screen image capture (context), an element image capture, other metadata (e.g., the application and application version), a combination thereof, etc. The encapsulated data/struct format may be extensible with future updates to the platform and is not limited to the above definition. Any suitable UI descriptor for identifying a UI element on a screen may be used without deviating from the scope of the invention. A unified target descriptor chains together multiple types of UI descriptors. A unified target descriptor may function like a finite state machine (FSM), where in a first context, a first UI descriptor mechanism is applied, in a second context, a second UI descriptor is applied, etc.

UI descriptors may be extracted from activities in an RPA workflow and added to a structured schema that groups the UI descriptors by UI applications, screens, and UI elements. UI descriptors may be part of one project for wide reuse, part of global repositories for testing purposes, or part of UI object libraries for global cross-project sharing in some embodiments. UI descriptors can be defined and added to the object library, which can be installed in other projects as dependencies after publishing in some embodiments. This makes the object library of UI descriptors available for reuse. A UI application in some embodiments is a targeted application that has multiple versions where each version has multiple screens.

The UI object repository and UI descriptor reuse may be beneficial for a variety of reasons. For instance, if the location, appearance, and/or functionality of a UI element in an application changes, the UI descriptor may be changed, and the change may then be propagated to activities using the UI descriptor. Thus, reusability may be provided at the level of identifying graphical elements in a UI.

This may be especially beneficial for accommodating new versions of applications. For a new version, a software developer may only need to update UI descriptors and/or develop a few new selectors from scratch, substantially reducing development time. For a webpage, for instance, HyperText Markup Language (HTML) may be inspected to obtain paths to UI elements for the corresponding selectors. Selectors for corresponding UI elements may be different in different web browsers and/or different versions of the same web browser. This concept may and also apply to visual desktop, server, smart phone, and tablet applications. UI object libraries may contain the actual selectors for the application, which is just one type of UI descriptor, per the above. A UI object library may have multiple UI descriptors of different types for one or more applications. UI descriptors may also refer to different technologies with which the application is built. For instance, different UI descriptors may be created and used for standalone desktop, web, and mobile applications. For one technology, you may want to use selectors, for another, you may want to use CV descriptors, etc.

A scope can be defined in the designer application by a user in some embodiments through a selection from a set of screens that are available in the object library. When the scope is tied 1-to-1 to a certain screen, the user can add UI actions (e.g., clicks, get text, etc.) and then use intelligent sensing of potential candidate options to map those actions to UI Objects. The set of objects may be limited to the list that is defined for the screen inside the UI object repository (e.g., a database of UI object libraries) in some embodiments.

Figure 10:
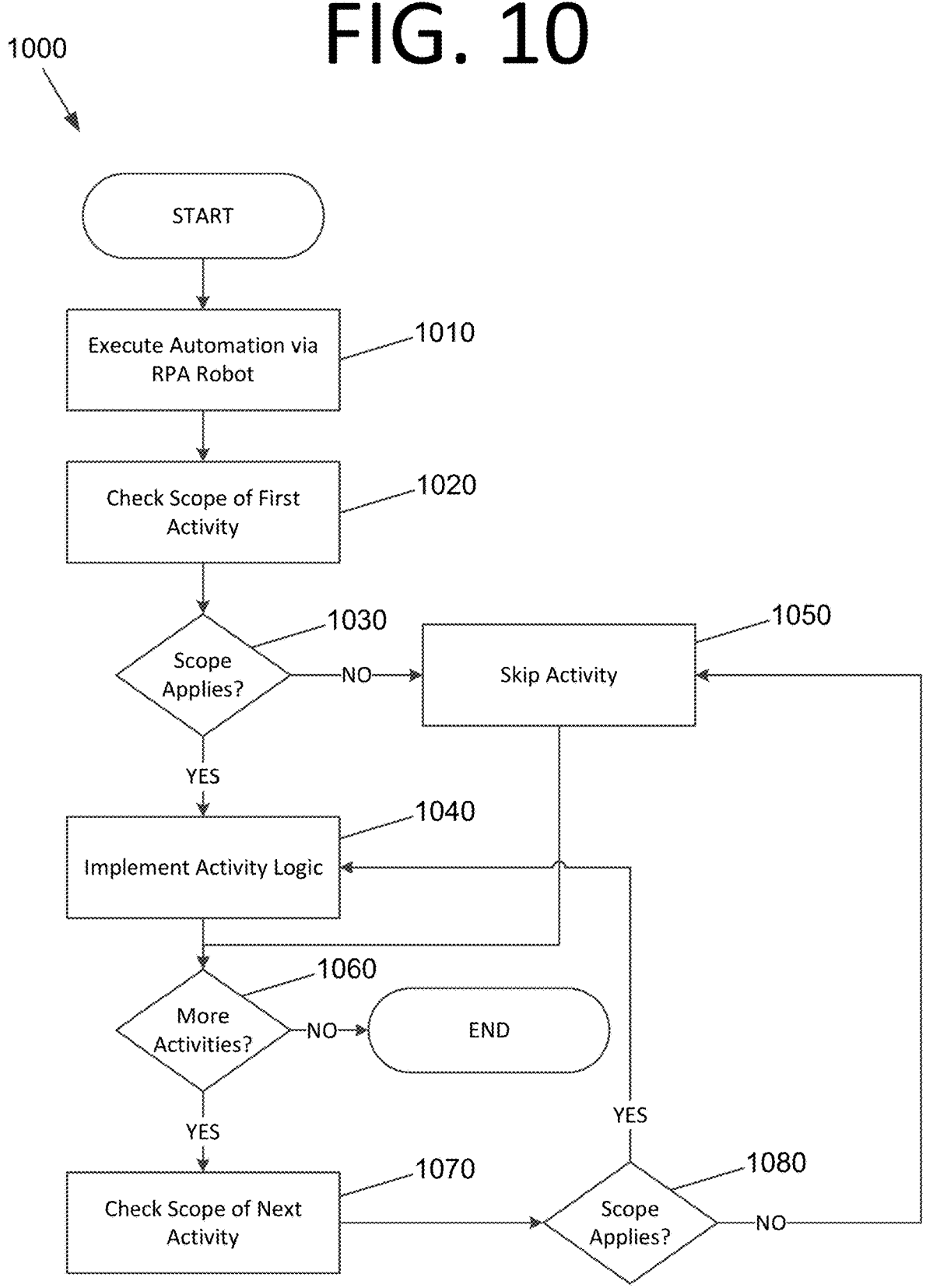
FIG. 10 is a flowchart illustrating a process for executing multi-target RPA automations at runtime with activity-level scope determinations, according to an embodiment of the present invention.

FIG. 10 is a flowchart illustrating a process 1000 for executing multi-target RPA automations at runtime with activity-level scope determinations, according to an embodiment of the present invention. The process begins with executing an automation via an RPA robot at 1010. The RPA robot checks the scope of the first activity at 1020. If the scope applies to the current platform at 1030, the RPA robot executes the activity logic for that platform at 1040. If not, the RPA robot skips the activity at 1050. If there are more activities at 1060, the RPA robot checks the scope of the next activity at 1070. If the scope applies at 1080, the RPA robot executes the activity logic for that platform at 1040, and if not, the RPA robot skips the activity at 1050. This is repeated for each activity until the end of the workflow is reached.

Figure 11:
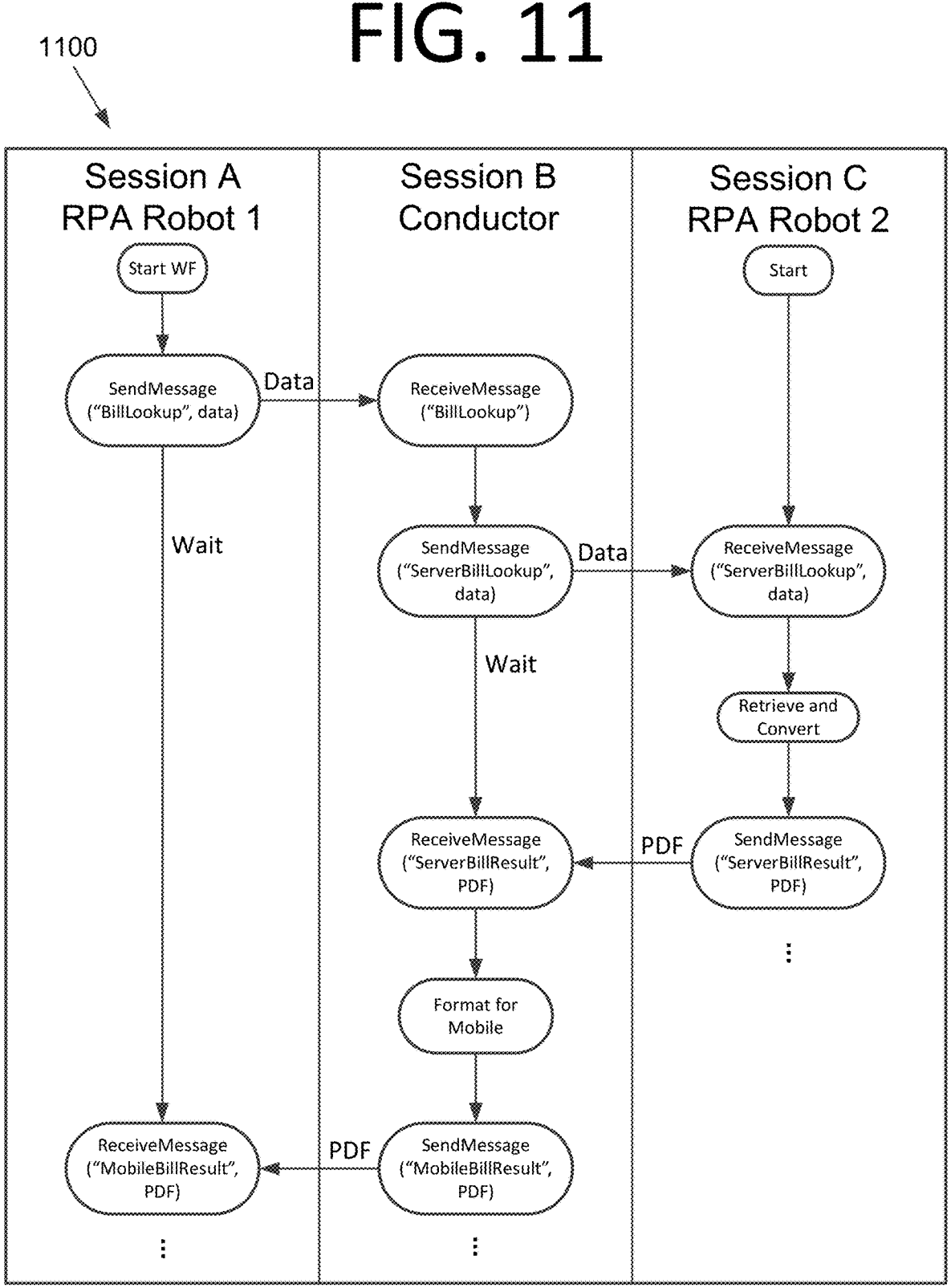
FIG. 11 illustrates a long-running workflow executing on multiple target platforms on different computing systems, according to an embodiment of the present invention.

Some embodiments pertain to long-running workflows where an automation starts on one platform and then continues running on at least one other platform. For instance, an RPA robot running on a mobile phone may interact with another RPA robot running on a server, either directly or via a conductor application, to implement RPA functionality involving these devices. Such a long-running workflow 1100 is shown in FIG. 11.

RPA robot 1 runs on a customer's mobile phone in session A, which has iOS® as the target platform. A conductor running in session B on a server facilitates communications between RPA robots on different computing systems. RPA robot 2 may be an attended customer service robot that runs on a customer service agent's computing system running Windows® 10, or potentially an unattended robot on a server running Linux® that automatically attempts to assist the customer. RPA robot 2 runs in session C.

In this long-running workflow example, RPA robot 1 seeks to retrieve a bill. RPA robot 1 sends the request to the conductor, which puts the request in a format that can be received and interpreted by RPA robot 2 and sends the request thereto. After sending the request, RPA robot 1 waits for the bill.

RPA robot 2 retrieves the bill information from a database and converts the information into PDF format. RPA robot 2 then sends the PDF to the conductor. The conductor puts the PDF in a format that can be received and interpreted by RPA robot 1 and sends the PDF thereto. RPA robot 1 then continues operation in accordance with its portion of the long-running workflow (e.g., displaying the PDF for a user of the mobile device).

Figure 12:
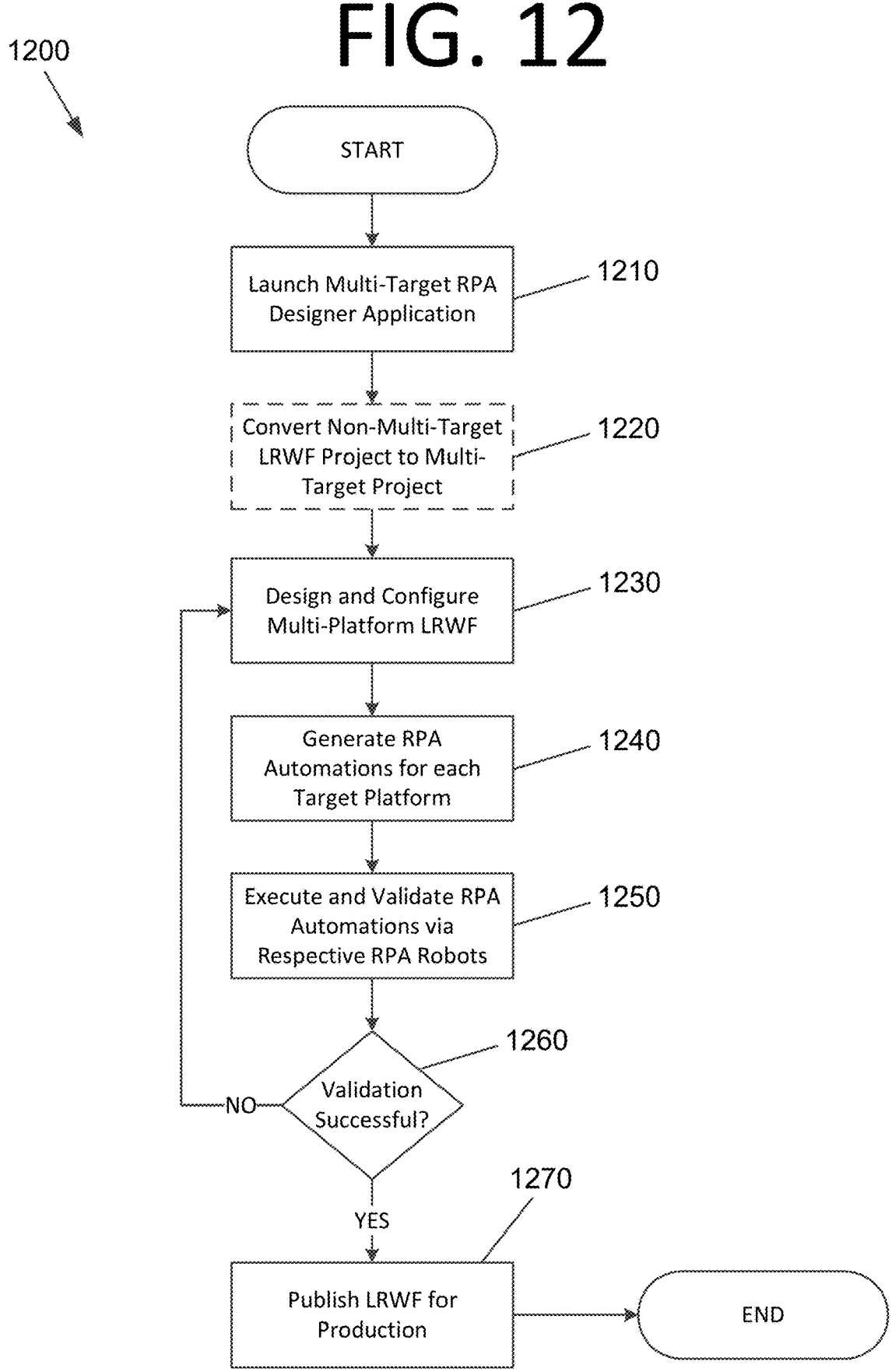
FIG. 12 is a flowchart illustrating a process for creating a long-running workflow that executes on multiple target platforms on different computing systems, according to an embodiment of the present invention.

FIG. 12 is a flowchart illustrating a process 1200 for creating a long-running workflow that executes on multiple target platforms on different computing systems, according to an embodiment of the present invention. The process begins with launching a multi-target RPA designer application at 1210. If the developer loads an existing non-multi-platform long-running workflow (LRWF) RPA project, the multi-target RPA developer application converts the non-multi-platform LRWF RPA project into a multi-target LRWF RPA project at 1220. This may be done at the instruction of the RPA developer or automatically. The conversion may include assigning a target platform to the LRWF activities or breaking the LRWF into separate RPA workflows for each target platform as "sub-processes" of the overall LRWF. The RPA designer application may be able to locate this information based on the operating system(s), versions stored in a UI object repository, etc. LRWF RPA workflow configurations with target platform designations are then received for the project and/or individual activities at 1230, unless the developer is only converting a non-multi-target LRWF RPA project into a multi-target LRWF RPA project. These configurations may include target platform selections and/or individual activity target platform version configurations in some embodiments.

In order to create a multi-platform LRWF, the developer may create the workflows for each target platform individually or by designating the target platforms at the activity level in a single RPA workflow. In the latter case, when the automations are generated based on the LRWF, the multi-target RPA designer application may generate separate automations for each target platform using the activities that are assigned to that platform. This allows an RPA developer to develop all LRWF logic in the same coherent workflow and without having to switch between workflows to accomplish the same LRWF automation.

Once the RPA workflow has been created, the multi-target RPA designer application generates automations implementing the LRWF on the target platforms at 1240. For the example of FIG. 11, this may include generating the automations for both the mobile device and the server. The RPA designer application then executes and validates the RPA automations on the target platforms via the RPA robots at 1250. This may include running the automation via an RPA robot on each target platform and validating that the automation functions as intended on each platform and collectively. If the validation is successful at 1260, the LRWF automations may be published for production (i.e., runtime use) at 1270. This may include publishing the LRWF and its respective activities, as well as the automation, in a library of a UI object repository. If not successful, the process may return to step 1230, and the RPA developer may modify the LRWF in an attempt to remedy the errors.

The process steps performed in FIGS. 9-12 may be performed by computer program(s), encoding instructions for the processor(s) to perform at least part of the process(es) described in FIGS. 9-12, in accordance with embodiments of the present invention. The computer program(s) may be embodied on non-transitory computer-readable media. The computer-readable medium/media may be, but are not limited to, a hard disk drive, a flash device, RAM, a tape, and/or any other such medium or combination of media used to store data. The computer program(s) may include encoded instructions for controlling processor(s) of one or more computing systems (e.g., processor(s) 510 of computing system 500 of FIG. 5) to implement all or part of the process steps described in FIGS. 9-12, which may also be stored on the computer-readable medium/media.

The computer program(s) can be implemented in hardware, software, or a hybrid implementation. The computer program(s) can be composed of modules that are in operative communication with one another, and which are designed to pass information or instructions to display. The computer program(s) can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computing system, comprising:
   memory storing computer program instructions for a multi-target robotic process automation (RPA) designer application; and
   at least one processor configured to execute the computer program instructions, wherein the computer program instructions are configured to cause the at least one processor to:
      (a) configure an RPA project in accordance with a target platform configuration comprising a plurality of target platforms,
      (b) configure multiple versions of one or more activities for the respective target platform for the respective version, or
      (c) both (a) and (b), and
      generate a multi-target automation that implements an RPA workflow on the plurality of target platforms, wherein
   the RPA project comprises the RPA workflow, and
   the RPA workflow comprises a plurality of activities.

2. The computing system of claim 1, wherein the computer program instructions are further configured to cause the at least one processor to:
   (d) receive the target platform configuration for the RPA project,
   (e) receive the multiple target platform versions of the one or more activities of the RPA workflow, or
   (f) both (d) and (e),
   after creation by an RPA developer.

3. The computing system of claim 1, wherein the target platform configuration is or comprises a global scope for the RPA project that generates activities for the plurality of different target platforms automatically within a scope of the RPA workflow.

4. The computing system of claim 1, wherein when a target platform is not designated, the computer program instructions are further configured to cause the at least one processor to:
   automatically designate a global scope for the RPA project that generates activities for the plurality of different target platforms automatically within a scope of the RPA workflow without manual selection of the multiple target platforms.

5. The computing system of claim 1, wherein the computer program instructions are further configured to cause the at least one processor to:
   execute and validate the multi-target automation on the plurality of target platforms via respective RPA robots.

6. The computing system of claim 5, wherein the validation of the multi-target automation comprises running the respective automation by the respective RPA robot on each target platform of the plurality of target platforms and validating that the multi-target automation functions as intended on each target platform of the plurality of target platforms.

7. The computing system of claim 5, wherein when the validation of the multi-target automation is successful, the computer program instructions are further configured to cause the at least one processor to:
   publish automations for the plurality of target platforms for production use in a user interface (UI) object library of a UI object repository.

8. The computing system of claim 1, wherein the RPA project is a previously created RPA project, and the computer program instructions are further configured to cause the at least one processor to:
   detect that the previously created RPA project is not a multi-target RPA project; and
   automatically convert the previously created RPA project to accommodate one or more additional target platforms, a plurality of platform-specific versions of the one or more activities, or both.

9. The computing system of claim 1, wherein the RPA workflow comprises a plurality of activities that comprise a tag, a variable, an array, or another descriptor or data structure that specifies one or more target platforms for the respective activity.

10. The computing system of claim 1, wherein the multi-target RPA designer application comprises a project target platform designation option that provides target platform options.

11. The computing system of claim 1, wherein the multi-target RPA designer application comprises an activity target platform designation option that provides target platform options for activities.

12. A non-transitory computer-readable medium storing a computer program for a multi-target robotic process automation (RPA) designer application, wherein the computer program is configured to cause at least one processor to:
   configure an RPA project in accordance with a target platform configuration comprising a plurality of target platforms; and
   generate a multi-target automation that implements an RPA workflow on the plurality of target platforms, wherein
   the RPA project comprises the RPA workflow, and
   the RPA workflow comprises a plurality of activities.

13. The non-transitory computer-readable medium of claim 12, wherein the target platform configuration is or comprises a global scope for the RPA project that generates activities for the plurality of different target platforms automatically within a scope of the RPA workflow.

14. The non-transitory computer-readable medium of claim 12, wherein when a target platform is not designated, the computer program instructions are further configured to cause the at least one processor to automatically designate a global scope for the RPA project that generates activities for the plurality of different target platforms automatically within a scope of the RPA workflow.

15. The non-transitory computer-readable medium of claim 12, wherein the computer program is further configured to cause the at least one processor to:
   execute and validate the multi-target automation on the plurality of target platforms via respective RPA robots.

16. The non-transitory computer-readable medium of claim 15, wherein the validation of the multi-target automation comprises running the automation by the respective RPA robot on each target platform of the plurality of target platforms and validating that the automation functions as intended on each target platform of the plurality of target platforms.

17. The non-transitory computer-readable medium of claim 15, wherein when the validation of the multi-target automation is successful, the computer program instructions are further configured to cause the at least one processor to publish the multi-target automation for production use in a user interface (UI) object library of a UI object repository.

18. The non-transitory computer-readable medium of claim 12, wherein the RPA project is a previously created RPA project, and the computer program is further configured to cause the at least one processor to:
   detect that the previously created RPA project is not a multi-target RPA project; and
   automatically convert the previously created RPA project to accommodate one or more additional target platforms.

19. The non-transitory computer-readable medium of claim 12, wherein the multi-target RPA designer application comprises a project target platform designation option that provides target platform options.

20. A computer-implemented method, comprising:
   configuring multiple versions of one or more activities for a respective target platform of a plurality of target platforms, by a multi-target robotic process automation (RPA) designer application; and
   generating a multi-target automation that implements an RPA workflow of the RPA project on the plurality of target platforms, by the multi-target RPA designer application, wherein
   the RPA project comprises the RPA workflow, and
   the RPA workflow comprises a plurality of activities.

21. The computer-implemented method of claim 20, further comprising:
   executing and validating the multi-target automation on the plurality of target platforms via respective RPA robots, by the multi-target RPA designer application.

22. The computer-implemented method of claim 21, wherein the validation of the multi-target automation comprises running the automation by the respective RPA robot on each target platform of the plurality of target platforms and validating that the multi-target automation functions as intended on each platform of the plurality of target platforms.

23. The computer-implemented method of claim 20, wherein when validation of the multi-target automation is successful, the computer-implemented method further comprises:
   publishing the multi-target automation for production use in a user interface (UI) object library of a UI object repository, by the multi-target RPA designer application.

24. The computer-implemented method of claim 20, wherein the RPA project is a previously created RPA project, and the computer-implemented method further comprises:
   detecting that the previously created RPA project is not a multi-target RPA project, by the multi-target RPA designer application; and
   automatically converting the previously created RPA project to accommodate a plurality of platform-specific versions of the one or more activities, by the multi-target RPA designer application.

25. The computer-implemented method of claim 20, wherein an RPA workflow of the RPA project comprises a plurality of activities that comprise a tag, a variable, an array, or another descriptor or data structure that specifies one or more target platforms for the respective activity.

26. The computer-implemented method of claim 20, wherein the multi-target RPA designer application comprises an activity target platform designation option that provides target platform options for activities.

* * * * *